United States Patent

Schipper

[15] 3,684,878

[45] Aug. 15, 1972

[54] BCD TO BINARY CONVERTER

[72] Inventor: Richard A. Schipper, San Diego, Calif.

[73] Assignee: Tele Cash, Inc., San Diego, Calif.

[22] Filed: Oct. 2, 1970

[21] Appl. No.: 77,451

[52] U.S. Cl. ............................235/155, 340/347 DD

[51] Int. Cl. ............................................H03k 13/258

[58] Field of Search .................235/155; 340/347 DD

[56] References Cited

UNITED STATES PATENTS

| | | | |
|---|---|---|---|
| 3,524,976 | 8/1970 | Mao Chang Wang | .....235/155 |
| 2,894,686 | 7/1959 | Holmes | ......................235/155 |
| 3,018,955 | 1/1962 | Mendelson | ................235/155 |
| 3,170,062 | 2/1965 | Boese et al. | ...............235/155 |

*Primary Examiner*—Maynard R. Wilbur
*Assistant Examiner*—Charles D. Miller
*Attorney*—Richard K. MacNeill

[57] ABSTRACT

A BCD to binary converter in which a plurality of shift registers receives BCD inputs in parallel and the outputs of each shift register is serially passed through 10-times multipliers until the proper decimal level is reached; each of the 10-times multipliers being an addition of a two-times and eight-times multiplier and the sum of the next least significant digit being added after each multiplication.

3 Claims, 1 Drawing Figure

PATENTED AUG 15 1972
3,684,878
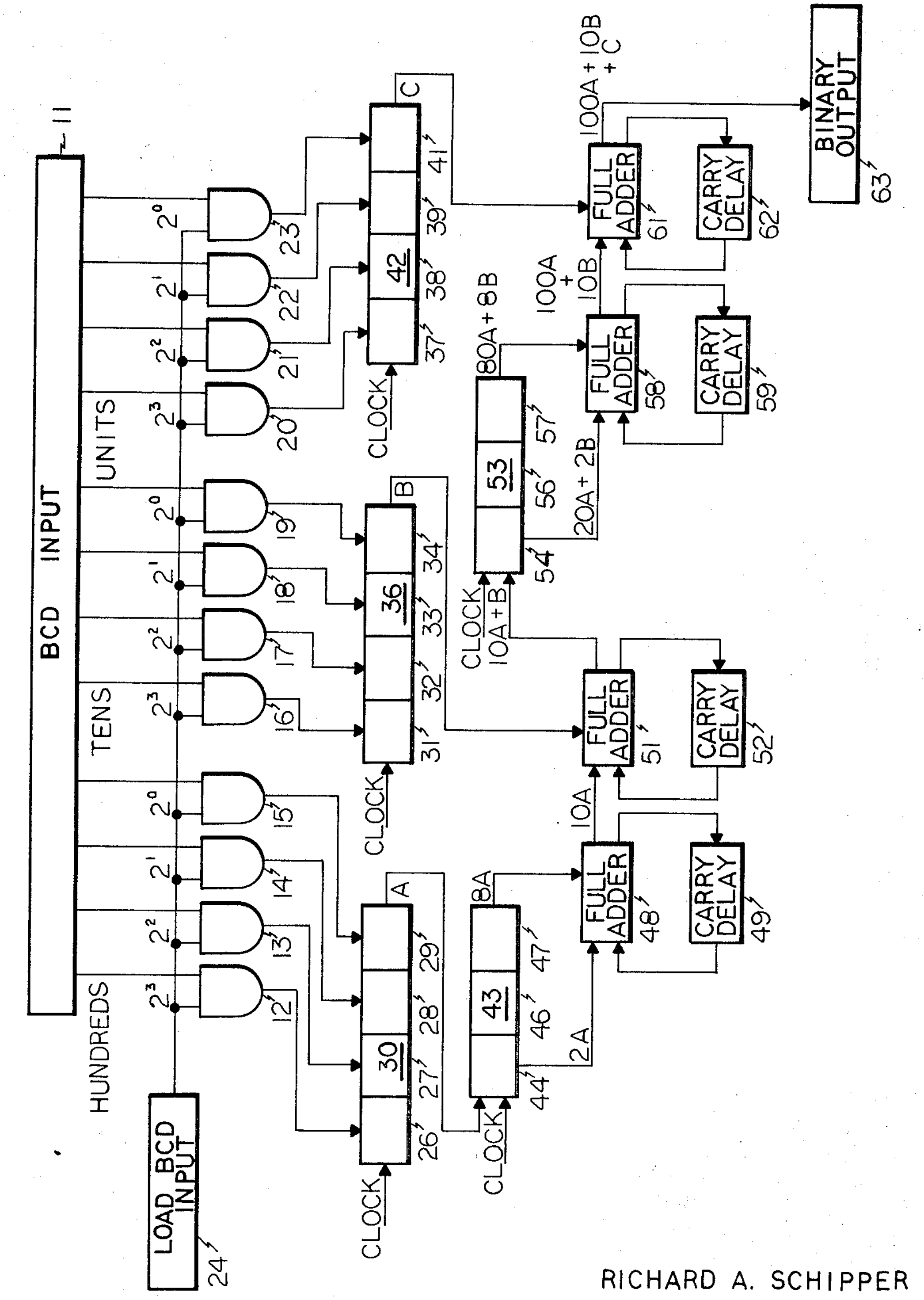
RICHARD A. SCHIPPER
INVENTOR
BY
RICHARD K. MACNEILL

BCD TO BINARY CONVERTER

BRIEF DESCRIPTION OF THE INVENTION

The present invention relates to a BCD to binary converter and more particularly to a BCD to binary converter which converts parallel BCD to serial binary.

According to the invention, a BCD input broken down in powers of 10 is presented in parallel to a plurality of shift registers. Each of the shift registers represents one digit of a number being converted. The output of the most significant shift register digit is passed through a 10-times multiplier, added to the next least significant digit and passed through an identical multiplier. This process is continued until the units digit is added to the previous outputs at which time the conversion is completed to a serial binary number.

An object of the present invention is the provision of an improved BCD to binary converter.

Another object of the invention is the provision of an improved parallel BCD to serial binary converter.

A further object of the invention is the provision of a BCD to binary converter which utilizes conventional components.

Yet another object of the invention is the provision of a BCD to binary converter which is inexpensive, simple to manufacture and extremely rapid in operation.

Other objects and many of the attendant advantages of this invention will be readily appreciated as the same becomes better understood by reference to the following detailed description when considered in connection with the accompanying drawing wherein the sole figure is a block diagram of the preferred embodiment of the present invention.

DETAILED DESCRIPTION OF THE DRAWING

Referring to the drawing, a BCD input terminal 11 has outputs coupled to the signal inputs of coincident gates 12, 13, 14, 15, 16, 17, 18, 19, 20, 21, 22 and 23. Gates 12 to 15 represent the hundreds digit, 16 to 19 the tens digit, and 20 to 23 the units digit. Each of gates 12 to 23 has an enabling input from load BCD input 24. Gates 12, 13, 14 and 15 have outputs coupled to stages 26, 27, 28 and 29, respectively, of shift register 30. Gates 16, 17, 18 and 19 have outputs coupled to stages 31, 32, 33 and 34, respectively, of shift register 36. Gates 20, 21, 22 and 23 have outputs coupled to stages 37, 38, 39 and 41, respectively, of shift register 42. Shift registers 30, 36 and 42 each have a clock input, as indicated.

The output of shift register 30 is coupled to an input of shift register 43 having stages 44, 46 and 47. The outputs of stages 44 and 47 are coupled to inputs of full adder 48. Full adder 48 has a carry delay 49 coupled from its output back to an input and an output coupled to an input of full adder 51.

Full adder 51 has another input coupled to an output of shift register 36 and has a carry delay 52 coupling an output of full adder 51 back to an input of full adder 51. Another output of full adder 51 is connected to an input of shift register 53. Shift register 53 has stages 54, 56 and 57.

The outputs of stages 54 and 57 of shift register 53 are coupled to inputs of full adder 58. Full adder 58 has a carry delay 59 coupled from an output back to an input of full adder 58. Full adder 58 has another output coupled to full adder 61 which has another input coupled from an output of shift register 42. Full adder 61 has a carry delay 62 coupled from an output back to another input. Another output of full adder 61 is coupled to binary output 63. Shift registers 43 and 53 have a clock input, as indicated.

OPERATION

In operation, it can be seen that BCD input 11 supplies input information to the hundreds gate 12 to 15, the tens gates 16 to 19, and the units gates 20 to 23. These gates are enabled by a load BCD input 24 when a readout is desired. The outputs of the hundreds, tens and units gates are coupled in parallel to the stages of shift registers 30, 36 and 42, respectively. The output of shift register 30, being the hundreds digit, must be multiplied by 100 which is accomplished by two 10-times multipliers. The multiplication takes place in the first multiplier in shift register 43, one output being taken from stage 44 assuming an input of A will yield an output 2A, as indicated, to full adder 48. Another output is taken from stage 47 which will have an output of 8A also applied to full adder 48 yielding 10A at its output. The output from shift register 36, representing the tens digit, is also applied to full adder 51 along with the output from full adder 48. This, assuming the input to full adder 51 is B, will yield 10A plus B, as indicated.

This 10A plus B is then applied as an input to shift register 53 which will yield one output from stage 54 of 20A plus 2B, and another output from stage 57 of 80A plus 8B. These are applied to full adder 58 and will yield 100A plus 10B. This sum is applied to one input of full adder 61. The output of shift register 42 is applied to another input of full adder 61 yielding 100A plus 10B plus C, which is the binary output taken at 63.

It can be seen that the hundreds digit, which is read out of shift register 30 as A, is multiplied twice by ten yielding 100A, the tens output from shift register 36, indicated as B, is multiplied 10 times, indicated as 10B, and the units output from shift register 42, indicated as C, is added as C at the final output. Naturally, should additional digits be required, additional shift registers and 10-times multipliers would be added ahead of the hundreds digit or behind the units digit, etc.

It should be understood of course that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention claimed is:

1. A BCD to binary converter for converting a complex number of *n* digits comprising:

*n* shift registers including a first shift register, a last shift register and at least one intermediate shift register;

coupling means coupling BCD inputs to each stage of each of said *n* shift registers, each shift register having inputs corresponding to one digit of a specific decimal value, the first shift register receiving the digit having the highest decimal value and the last shift register receiving the digit having the lowest decimal value, said at least one intermediate shift register receiving digits declining in decimal value from the first shift register to the last shift register;

a plurality of 10-times multipliers each having an input coupled to the output of a different one of said shift registers except the last shift register;

a plurality of adding means each having one input connected to an output of a different one of said 10-times multipliers and another input connected to an output of the next lower shift register, said adding means having an output coupled to an input of the still next lower shift register; and final adding means having an input coupled to the output of the last shift register and having another input connected to an output of the last 10-times multiplier.

2. The BCD to binary converter of claim 1 wherein said plurality of 10-times multiplier comprises:

a two-times multiplier;

an eight-times multiplier;

adding means coupled to the outputs of said two-times multiplier and said eight-times multiplier.

3. The BCD to binary converter of claim 2 wherein:

said two-times multiplier and said eight-times multiplier comprises a three-stage shift register.

* * * * *